Oct. 19, 1948.  W. F. BRADLEY  2,451,912
LOADING DEVICE FOR PLASTIC MOLDING MACHINES
Filed May 31, 1947  2 Sheets-Sheet 1

INVENTOR.
WILBURN F. BRADLEY
BY
Carlson, Pitzner, Hubbard + Wolfe
ATT'YS.

Oct. 19, 1948.  W. F. BRADLEY  2,451,912
LOADING DEVICE FOR PLASTIC MOLDING MACHINES
Filed May 31, 1947  2 Sheets-Sheet 2
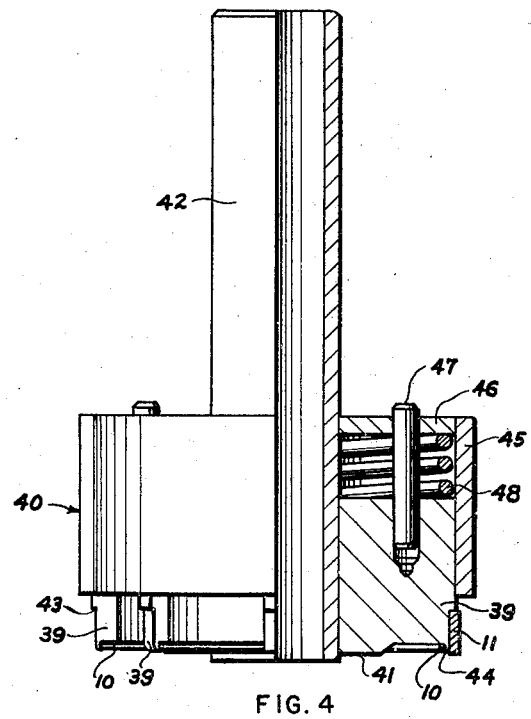
FIG. 4
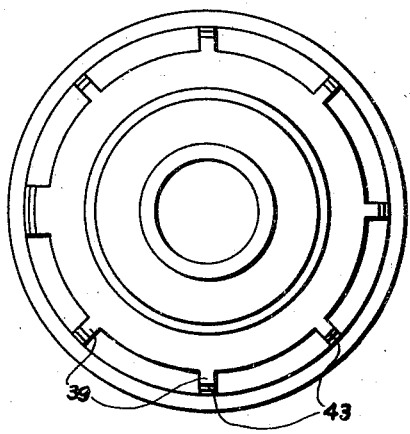
FIG. 5
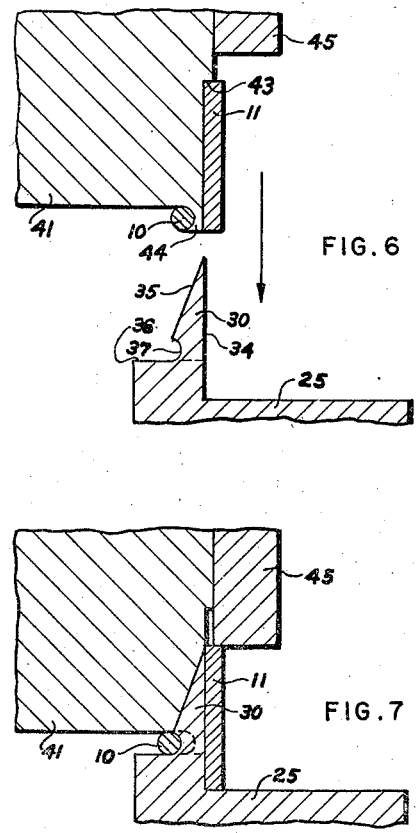
FIG. 6
FIG. 7
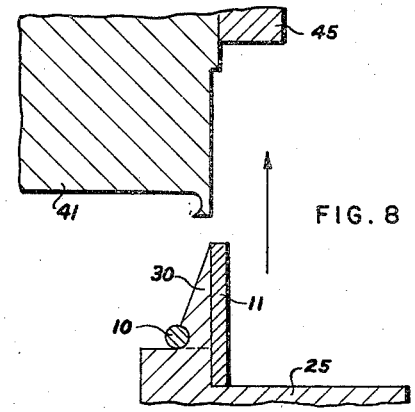
FIG. 8
INVENTOR.
WILBURN F. BRADLEY
BY
Carlson, Pitzner, Hubbard & Wolfe
ATT'YS.

Patented Oct. 19, 1948

2,451,912

UNITED STATES PATENT OFFICE 2,451,912

LOADING DEVICE FOR PLASTIC MOLDING MACHINES

Wilburn F. Bradley, Hollywood, Ill.

Application May 31, 1947, Serial No. 751,537

9 Claims. (Cl. 18—1)

The present invention relates generally to improvements in plastic molding machines, and has particular reference to new and improved means for positioning metal inserts in the molding die preparatory to the molding operation.

One of the objects of the invention is to provide a loading device for positioning such inserts both expeditiously and accurately.

Another object is to provide a loading device of the foregoing character which can be used without necessitating that the operator touch the die, and hence while the mold is hot.

Further objects and advantages will become apparent as the description proceeds.

In the accompanying drawings:

Fig. 4 is a view, partially in side elevation and partially in axial section, of a loading device embodying features of the invention.

Fig. 5 is an end view of the device.

Figs. 6, 7 and 8 are fragmentary sectional views illustrating successive steps in the loading operation.

Figure 1:
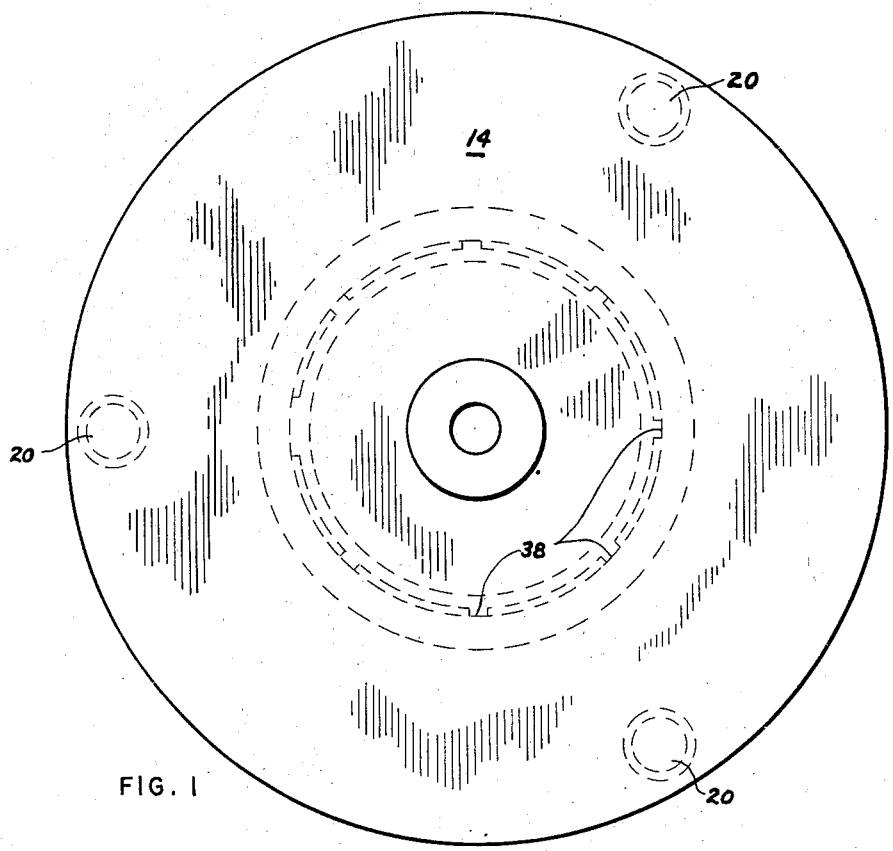
Fig. 1 is a plan view of a die or mold embodying certain features of the present invention.

Referring more particularly to the drawings, the loading device or jig, constituting the exemplary embodiment of the present invention, is designed to position certain metal elements, such as a split spring wire ring 10 and a circular metal band 11, in the female element 13 of a molding die 12 for producing a seal of plastic material, such as rubber. The die 12 also has a male element 14 cooperating with the element 13 to define a molding cavity 15 of a shape determined by the form of the seal.

Figure 2:
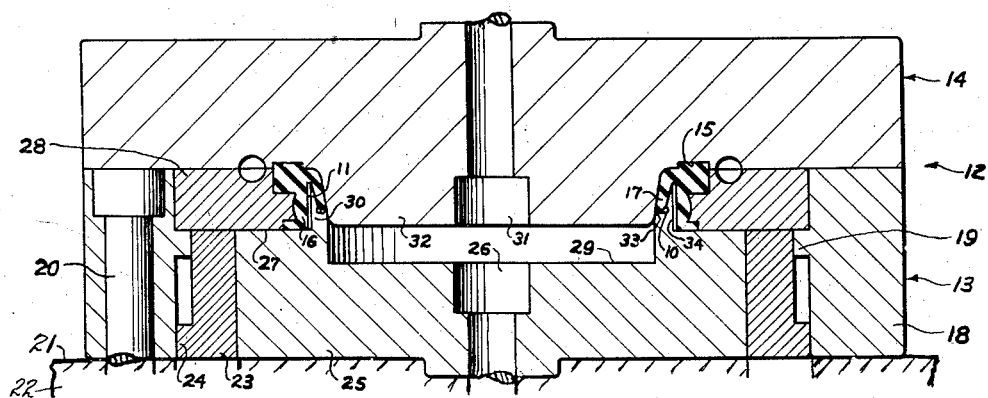
Fig. 2 is an axial sectional view of the die.
Figure 3:
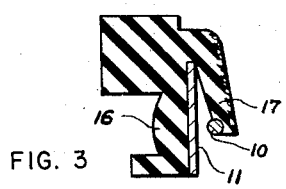
Fig. 3 is a fragmentary sectional view of a typical workpiece adapted to be molded.

In the particular form disclosed, the seal (see Figs. 2 and 3) comprises an annular body 16 of molded resilient rubber formed on the inner periphery with an internal inclined annular lip 17. The ring 10 is molded, in a rubber to metal bond, to the outermost edge of the lip 17, and protrudes partially therefrom to define a circumscribing rib or bead. The metal band 11 is similarly molded to the inner peripheral surface of the body 16 about the lip 17.

In the preferred construction of the die 12, the female element 13 comprises an outer circular ring 18 which is formed on its inner peripheral surface with an intermediate annular rib 19, and which is adapted to be rigidly secured, as by bolts 20, to a flat mounting surface 21 on a suitable support 22. A coaxial ejector or stripper ring 23 extends slidably through the ring 18, and has an external peripheral end flange 24 engageable with the rib 19 to limit outward movement. Fitting within the ring 23 is a center plate 25 adapted to be secured by a bolt 26 to the support 22, and having an annular surface 27 in the same plane as the outer face of the rib 19. A diametrically split die ring 28 is fitted in the outer ring 18, and rests on the rib 19 and plate 25 when the ejector ring 23 is in retracted position. The inner peripheral surface of the die ring 28 is shaped to define the outer configuration of the die cavity 15. Projecting outwardly from the surface 27 about a large axial depression or bore 29 in the center plate 25 is an annular end-face flange 30 configurated to define that portion of the die cavity 15 between the body 16 and lip 17. That portion of the flat surface area 27 between the ring 28 and flange 30 serves to define the base of the die cavity 15. The remaining portion of the cavity 15 is formed in the inner face of the male element 14 which consists of a circular plate adapted to be secured, as by a bolt 31, to a suitable support (not shown) for relative movement into and out of tight engagement with the element 13, and which is formed with an axial projection 32 adapted to enter the recess 29 in contact with an inner edge 33 of the flange 30. More particularly, the projection 32 is slightly tapered to conform in shape to the inner surface of the lip 17, and is rounded at the end edge to shear off the rubber and liner fabric at the flange edge 33.

The upstanding flange 30 has an outer cylindrical surface 34 about which the band 11 is snugly positioned as a preparatory step before closing the die 12, and an inner tapered or conical surface 35 terminating at a shoulder 36 and conforming in shape to the lip 17. At the juncture with the shoulder 36, the surface 35 is undercut to provide a groove 37 for the reception of the wire ring 10 as a preparatory step before closing the die 12.

It will be understood that the production mold or die may be modified in various respects without departing from the invention. Thus, the split die ring 23 may be provided in a greater width so as to project outwardly from the face of the outer ring 18 into a complemental annular groove (not shown) in the face of the male element 14, thereby insuring a tighter cavity seal and accurate alignment of the die sections during the approach movement.

One of the primary features of the invention resides in the provision of means for positioning the spring wire 10 and the band 11 in the die section 13 expeditiously, accurately, and without necessitating touching of the die by the hands of the operator. In this connection, it will be appreciated that insertion of these parts solely by the use of the hands would be awkward and time-consuming, and would necessitate cooling of the die after each molding operation. The resulting loss of time would materially reduce the productive capacity of the molding machine. Accordingly, the core flange 30 is formed with a plurality of uniformly peripherally spaced radial slots 38 opening therethrough to the shoulder 36, and adapted to receive and slidably interfit with a series of loading fingers 39 on a loading tool or jig 40 (see Figs. 4 to 8). All of the slots 38 are of uniform width, excepting one which is considerably wider than the rest, and the fingers 39 correspond in number, width and spacing therewith.

The tool 40 in its preferred form comprises a generally cylindrical body 41 adapted to enter the recess or bore 29, and having an axial operating handle 42. The series of fingers 39 are carried by and annularly arranged about the axis of the body 41. Each finger 39 is formed in the outer edge with a notch 43 adapted to receive the band 11, and in the inner edge with a hook 44 adapted to receive the wire 10, the split ends of the latter meeting at the one wide finger. Slidably mounted on the body 41 is a stripper sleeve 45 adapted to telescope closely over the flange 30 and having an end wall 46 guided on pins 47. A coiled compression spring 48 is interposed between the body 41 and the wall 46, and tends to urge the sleeve 45 into retracted position. The notch 43 is shallower than the width of the band 11 so that the latter projects therefrom into the path of the sleeve 45.

In operation, the band 11 is inserted about the fingers 39 in the notches 43, and the wire is inserted in the hooks (see Fig. 6). This may be accomplished easily and quickly, and while the molding machine is in operation. Thereupon, the body 41 is located to dispose the fingers 39 in alignment with the slots 38, and is inserted into the female element 13. As the fingers 39 move inwardly along the slots 38 (see Fig. 7), the wire 10 contacts the conical surface 35, and is cammed inwardly thereby and contracted circumferentially along the ends of the fingers out of the hooks 44 until in registry with the groove 37. Thereupon, the wire 10 is released and expands into engagement in the groove 37. Simultaneously, the band 11 carried by the fingers 39 is positioned about the flange 30. The stripper sleeve 45 is now held against the outer edge of the band 11 while the body 41 with the fingers 39 is retracted, thereby removing the tool 40 from the band (see Fig. 8). Thus, the wire 10 and band 11 are transferred from the tool 40 to the female die element 13 in a simple and expeditious operation and while the die 12 is hot, thereby permitting prompt recycling of the molding machine. After the wire 10 and band 11 have been inserted, rubber stock is placed in the mold cavity 15, and a preformed fabric washer placed thereover. The die is now closed and heated to form and cure the rubber and to bond it to the wire 10 and band 11 and to the fabric liner. In the die closing operation, the projection 32 severs or shears off the fabric liner with a clean cut at the edge 33.

I claim as my invention:

1. A loading device for plastic molding dies comprising, in combination, a body, and a plurality of rigid peripherally spaced fingers on said body, said fingers being annularly arranged about the axis of said body in fixed relation, and extending generally longitudinally of the axis of said body and being formed with hooks to receive a split spring circular wire movable laterally out of engagement therewith.

2. A loading device for plastic molding dies comprising, in combination, a body and a plurality of rigid peripherally spaced fingers on said body, said fingers being annularly arranged about the axis of said body in fixed relation, and extending generally longitudinally of the axis of said body and being formed in their inner sides with hooks to receive a split spring circular wire under compression contractible out of engagement therewith.

3. A loading device for plastic molding dies comprising, in combination, a body and a plurality of peripherally spaced fingers on said body, said fingers being annularly arranged about the axis of said body, and extending generally longitudinally of the axis of said body and being formed in their inner sides with hooks to receive a split spring circular wire under compression contractible out of engagement therewtih, the outer side edges of said fingers being parallel to enter and retain an encircling band.

4. A loading device for plastic molding dies comprising, in combination, a body and a plurality of peripherally spaced fingers on said body, said fingers being annularly arranged about the axis of said body, and extending generally longitudinally of the axis of said body and being formed in their inner sides with hooks to receive a spit spring circular wire under compression contractible out of engagement therewith, the outer side edges of said fingers being parallel to enter and retain an encircling band, and a stripper sleeve slidable on said body and movable axially to remove said band from said finger.

5. A loading device for plastic molding dies comprising, in combination, a body and a plurality of peripherally spaced fingers on said body, said fingers being annularly arranged about the axis of said body, and extending generally longitudinally of the axis of said body and being formed in their inner sides with hooks to receive a split spring circular wire under compression contractible out of engagement therewith, the outer side edges of said fingers being parallel to enter and retain an encircling band, a stripper member on said body and relatively shiftable along said fingers to remove said band, and a spring urging said member into retracted position.

6. In a device of the class described, in combination, a molding die element having an upstanding annular flange including a conically tapered inner surface area defining a wall of a die cavity, said flange being formed with a plurality of peripherally spaced radial slots open to the upper ends thereof and with an internal peripheral groove at the bottom of said conically tapered surface area and adjacent the lower ends of said slots to receive a spring wire ring, and a loading device having a body adapted to be inserted axially into said flange and having a plurality of peripherally spaced fingers adapted respectively to enter and slidably interfit with said slots, said fingers being formed on their inner sides with hooks to receive said ring, said body upon movement into said flange being effective to force said ring along said conically tapered surface area and into registration with said groove, whereby said ring is contracted out of said hooks and subsequently expands and transfers into said groove.

7. In a device of the class described, in combination, a molding die element having an upstanding annular flange with an outer cylindrical surface area and a conically tapered inner surface area defining walls of a die cavity, said flange being adapted to receive externally an encircling band and being formed with a plurality of peripherally spaced radial slots open to the upper ends thereof and with an internal peripheral groove at the bottom of said conically tapered surface area and adjacent the lower ends of said slots to receive a spring wire ring, and a loading device having a body adapted to be inserted axially into said flange and having a plurality of peripherally spaced fingers for carrying said band and adapted respectively to enter and slidably interfit with said slots to transfer said band into loaded position circumferentially about said flange, said fingers being formed on their inner sides with hooks to receive said ring, said body upon movement into said flange being effective to force said ring along said tapered surface area into registration with said groove, whereby said wire is contracted out of said hooks and subsequently expanded and transferred into said groove.

8. In a device of the class described, in combination, a molding die element having an upstanding flange which includes a downwardly tapered surface area inclined from a relatively narrow portion at the top of said area to a relatively wide portion at the base of said area, said flange being formed with a plurality of upwardly-extending, spaced slots open at their upper ends and with a horizontal groove at the base of said downwardly tapered surface area and adjacent the bottoms of said slots to receive a wire, and a loading device having a body adapted to be moved axially and downwardly into engagement with said flange and having a plurality of spaced, downwardly extending fingers adapted, respectively, to enter and slidably interfit with said slots, said fingers being formed on their lower ends with hooks to receive said wire, said body upon movement downwardly of said flange with said wire engaging the downwardly tapered surface area being effective to force said wire along said downwardly tapered surface area and into registration with said groove, whereby said wire is moved out of engagement with said hooks and subsequently transfers into said groove.

9. In a device of the class described, in combination, a molding die element having an upstanding flange one wall of which is plane and substantially vertical and the opposite wall of which includes a downwardly tapered surface area inclined from a relatively narrow portion at the top of said area to a relatively wide portion at the base of said area, said flange being adapted to receive on its plane and substantially vertical wall a band and being formed with a plurality of upwardly-extending, spaced slots open at their upper ends and with a horizontal groove at the base of said downwardly tapered surface area and adjacent the bottoms of said slots to receive a wire, and a loading device having a body adapted to be moved axially and downwardly into engagement with said flange and having a plurality of spaced, downwardly-extending fingers for carrying on one side thereof said band and adapted, respectively, to enter and slidably interfit with said slots to transfer said band into loaded position on the plane and substantially vertical wall of said flange, said fingers being formed at the lower ends of their sides opposite the sides thereof which normally carry said band during the loading operation with hooks to receive said wire, and said body upon movement downwardly of said flange with said wire engaging the downwardly tapered surface area being effective to force said wire along said downwardly tapered surface area and into registration with said groove, whereby said wire is moved out of engagement with said hooks and subsequently transfers into said groove.

WILBURN F. BRADLEY.

REFERENCES CITED

The following references are of record in the file of this patent:

UNITED STATES PATENTS

| Number | Name | Date |
|---|---|---|
| 1,319,297 | Limacher | Oct. 21, 1919 |
| 1,544,316 | Hazeltine | June 30, 1925 |
| 2,357,139 | Seme | Aug. 29, 1944 |
| 2,422,549 | Hogin | June 17, 1947 |

Certificate of Correction

Patent No. 2,451,912.                                           October 19, 1948.

WILBURN F. BRADLEY

It is hereby certified that error appears in the printed specification of the above numbered patent requiring correction as follows:

Column 4, line 37, for the word "spit" read *split*;

and that the said Letters Patent should be read with this correction therein that the same may conform to the record of the case in the Patent Office.

Signed and sealed this 18th day of January, A. D. 1949.

[SEAL]

THOMAS F. MURPHY,
*Assistant Commissioner of Patents.*